Figure 1:
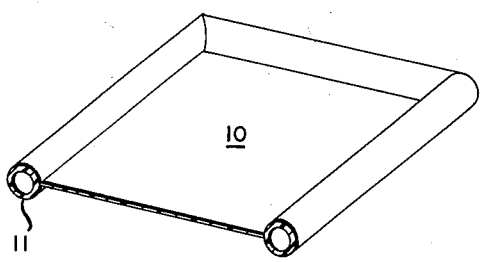

Dec. 25, 1962    E. A. MALICK    3,070,419
PROTECTION OF A LIQUID SUCH AS A WATER SUPPLY AGAINST
FALLOUT, DUST, AND LOSS BY EVAPORATION
Filed June 19, 1959

INVENTOR.
E. A. MALICK
BY
Hudson & Young
ATTORNEYS

United States Patent Office

3,070,419
Patented Dec. 25, 1962

3,070,419
PROTECTION OF A LIQUID SUCH AS A WATER SUPPLY AGAINST FALLOUT, DUSTS, AND LOSS BY EVAPORATION
Emil A. Malick, Bartlesville, Okla., assignor to Phillips Petroleum Company, a corporation of Delaware
Filed June 19, 1959, Ser. No. 821,441
6 Claims. (Cl. 21—60.5)

This invention relates to the protection of a liquid such as a water supply. In one of its important aspects, the invention relates to the covering of a large body of water which is subjected to wave action or turbulence with a plurality of floating covering elements of such a kind and character that the elements will not stack up on one another or overlap, thereby uncovering a portion of the outer surface to be protected, as when there is a strong wind blowing or a boat moving through channels temporarily provided for reservoir inspection or treatment or when a strong current may be caused by swollen streams flowing into the reservoir or a lake of water supply, the said elements being provided with an integral or attached device, element or bumper designed and shaped to prevent a floating element from slipping up over another floating element. In another of its aspects, the invention provides a method of covering a water surface of large area, operating entirely from the shore line, the method comprising the steps of floating upon said water a plurality of floating elements as herein described in a number sufficient to cover said water supply. In a further aspect of the invention it relates to a covering comprising essentially a plurality of sheet-like members, preferably of a floating plastic material, as herein discussed, flexibly connected, as by spot-sealing or welding and of sufficient rigidity that bumpers are not needed. Such a covering can be further equipped with buoys and/or stiffening struts as later described, or as shown in the drawing. Thus, in a further aspect of the invention it relates to a method of covering a large body of liquid such as a water lake which comprises floating sheets of plastic upon the liquid, from a point at the shore-line and flexibly connecting said sheets as by spot welding the same as these are fed out upon the liquid.

An especially important aspect of the invention relates to the covering and protecting of a large body of water against fallout, dusts and loss of water by evaporation employing elements and/or a method as herein described.

In a further aspect of the invention it relates to the types of floating elements described flexibly interconnected to permit motion without separation of them and/or the addition or subtraction of elements from the cover as the size of the water reservoir or lake may vary.

In a specific embodiment of the invention the floating elements can be made of any suitable material such as a suitable plastic, metal, wood, etc., but at present writing plastic is by far to be preferred over any other material for reasons appearing herein.

In a now preferred specific embodiment of the invention, it relates to floating elements as herein set forth and described, made of a polyolefin such as polyethylene and/or polypropylene of such a thickness and relative rigidity that the element or sheet of the plastic constantly tends, in a preferred construction and arrangement of the cover, to extend to its greatest area thus avoiding that the sheet shall crumple or otherwise fail to adequately cover its share of the area to be protected. The sheet is provided with an integral or added thicker portion, lip or bumper element which in a now preferred form extends substantially entirely around the periphery of the sheet or element in a substantially vertical position either upwards and/or downwards from the level of the sheet, thus to prevent overlapping as earlier discussed.

It has now been conceived that to protect large bodies of liquid such as a water or other supply from contamination and/or from loss of liquid due to surface evaporation that a plurality of floating elements can be floated out over the surface of the supply, from the shore line, in a number sufficient to completely cover, as desired, the entire area of the supply, provided that each floating element possesses two important or essential characteristics, as herein stated, namely, the tendency to remain extended substantially to the largest dimension which can be assumed on water in motion and a shape such that the elements will abut each other without overlapping or slipping up of one element upon another.

An object of the present invention is to provide protection for a liquid such as a water supply. Another object of the invention is to provide a method for covering a liquid supply of large area, such as a water lake or reservoir to protect the same against contamination by dusts, fallout, or loss by evaporation. A further object of the invention is to provide a floating element of such kind and character that when a plurality of them is placed upon a reservoir or other large body of liquid, they will be self distributing and adjusting as to relative position thereon and will not slide up one on the other or collapse due to lateral pressure exerted against each other. In a further object, the invention provides a covering for a water supply which protects the same as herein explained but which will allow rain to pass therethrough as may be desired in one or more embodiments.

Other aspects, objects and the several advantages of the invention are apparent from a study of the disclosure, the drawing and the appended claims.

According to the present invention, there is provided a method of protecting a liquid supply and/or for preventing surface evaporation from a large body of liquid, such as water in a lake or in a large storage reservoir, subject to wave motion, turbulence, or moving currents, due to wind or other reasons such as discharge of stream waters thereinto, which comprises floating onto said large body of liquid a plurality of substantially vapor impervious flexible, but sufficiently rigid to tend to remain extended, sheet-like floating elements, each having an extended area and each being peripherally surrounded by a bumper element which prevents stacking upon each other of said floating elements whenever turbulence, wave motion or currents or other action of the water causes adjacent elements to tend to slip over each other and, therefore, to leave an open exposed area of liquid.

Still further according to the invention, there are provided floating elements essentially sheet-like in character which are sufficiently rigid as to tend to remain in extended form at all times, even when abutting against each other on a large surface whereupon these are subjected to wave action or wind pressure, etc., each of said floating elements having a bumper means at its periphery, in a preferred form, surrounding the entire element at its periphery, to prevent said elements from stacking up on each other or overlapping when pressed against each other by wave motion, wind action, or for some other reason.

Still further according to the invention, there is a method provided for covering a lake or water reservoir or other large body of liquid supply which comprises the steps of floating a plurality of elements as herein described upon said body of liquid from a shore line and making use of the elements themselves to cause even distribution and placement of each element at a desired location.

Still further according to the method of the invention, the floating elements can be flexibly or otherwise joined together to form an essentially continuous flexible cover. When so joined, the joining, according to the method of the invention, can be accomplished as these elements are placed onto the body of liquid at the shore line. Thus, the cover can be gradually built out over the entire area from essentially a single position.

Still further according to the invention, a bumper element can be made integrally with or added to each of the floating elements and can extend somewhat outwardly therefrom but essentially will extend in a vertical direction either upwards or downwards or both upwards and downwards from the sheet-like element as to prevent the overlapping herein mentioned.

Still further, there is provided a protected body of liquid having a large extended surface area, such as a water supply, wherein the floating elements are flexibly interconnected and those nearest the shore line up-wind are firmly anchored on the shore to relieve undue compressive pressure on the sheet-like members when there is flowing a strong current or there exists a strong wind. The choice of location can be readily made by one skilled in the art in possession of this disclosure. It is within the scope of the invention to anchor such a covering at more than one position along the shore line and, indeed, such a covering can be suitably anchored at several points distributed over the entire shore line, as desired.

Still further according to the invention, the sheet-like members can be equipped with flexible or other struts and buoy members to aid in floating of the floating elements and in maintaining these in a desired extended position.

The polyolefins such as polyethylene and polypropylene are now preferred, because these plastics have unusually desirable properties. Probably one of the most important properties of the polyolefins as herein set forth is that these will float, being of a density lower than that of water. Another property is that these materials will not rust, will not decay, and will not mildew. Other properties of the polyolefins needless to enumerate here, which are well known, are relied upon for preferring these materials. Two important aspects of the invention as applied to prevent surface water evaporation when a polyolefin of density less than water is used is that a self-supporting film can be used in continuous contact with the water surface which provides a surface tension effect which greatly reduces the rate of evaporation of the water.

Another very important reason for preferring polyolefins is that these can be obtained in such condition as to be resistant to fallout or radioactivity rendering these materials particularly excellent for the protection of large water supplies as water reservoirs supplying water to cities or to forming areas where cattle, etc., require water for existence.

Although it is possible to cause other materials such as metals to float as when provided with floats or air tanks, the plastics are also preferred because these can be prepared in thin films which when properly sealed in the form of tubing or envelopes can be inflated with gases. Plastics which can be used according to the invention include blown plastics which will float.

In an important modification of the floating elements of the invention, it is possible to surround the sheet-like plastic element with a pipe-like element of sufficient diameter to provide the bumper action which prevents overlapping, as discussed herein.

Figure 2:
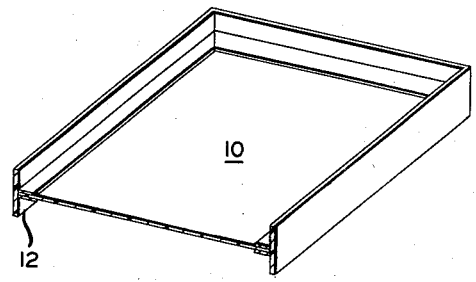
Figure 3:
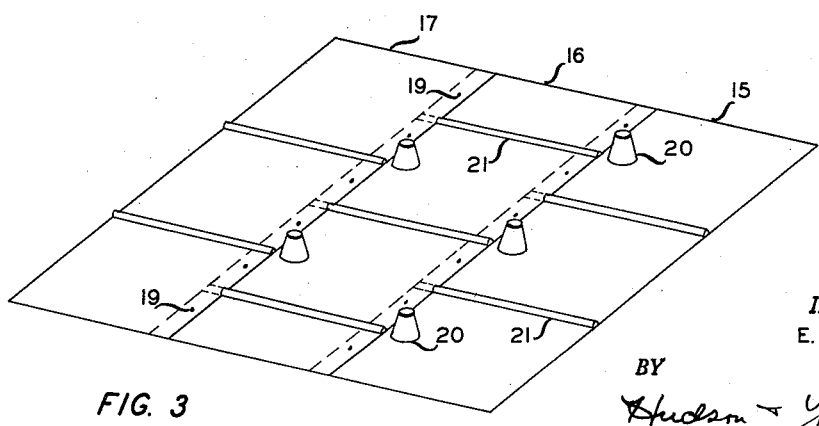

Referring now to the drawing, FIGURE 1 shows a cross-sectional view taken vertically through a floating element shown in isometric projection comprised of a sheet-like plastic such as polyethylene or polypropylene, peripherally equipped with a tube or pipe-like bumper element. FIGURE 2 shows a similar floating element equipped with a substantially vertical bumper element which extends both upwardly and downwardly of the sheet-like portion of the floating element. FIGURE 3 shows large sheets of film, supported by buoys and reinforced with stiffening members at regular intervals. The sheets here shown are spot-sealed together, being of polyethylene, as the sheets are floated out over the water reservoir.

Figure 4:
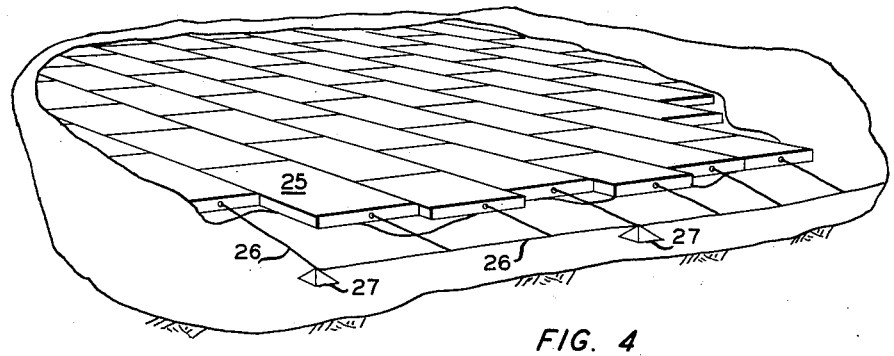

FIGURE 4 shows a number of elements such as those in FIGURES 1 and 2, the elements having been flexibly connected and the whole being anchored at the shore line, as discussed herein.

Referring now to FIGURE 1, element 10 is made of polyethylene of 5 mils thickness, having a density of 0.96 and, therefore, quite capable of floating on water by itself without additional support. Pipe 11 surrounds element 10 providing the bumper action herein discussed.

Referring now to FIGURE 2, element 10 is made of polyethylene, as earlier described, and 12 is a bumper which substantially completely surrounds the sheet 10. Twelve, it will be noted, is integrally added to sheet 10 by heat sealing, also being made of polyethylene but of a slightly larger thickness and greater rigidity. The rigidity of elements 10 in both FIGURES 1 and 2 is sufficient to normally maintain these sheet-like members in extended position.

Referring now to FIGURE 3, the sheet-like elements of plastic 15–17, inclusive, are overlapped and spot-welded, as indicated at 19 and are supported, in this embodiment, by buoys 20. When such a cover is floated out over a large body of liquid it will not need to be provided with bumper elements since it is in essentially a single unit. The sheets can be of rigidity sufficient to maintain themselves extended over the desired area to be covered. In a modification, there can be provided struts 21 for stiffening purposes. Struts 21 can be integrally molded in the plastic sheet or can be spot welded thereto as one skilled in the art in possession of this disclosure can readily understand. It will be noted that the spot welding provides a flexible connection and that although the sheets could be welded together completely, that is, substantially their entire line of juxtaposition, this is not now preferred since obviously, rainwater, etc., must be encouraged to drain through the covering to avoid unduly weighting the same.

Referring now to FIGURE 4, a large number of elements 25, such as those shown in FIGURES 1 and 2, are shown in place on a reservoir. The elements 25 are staggered on the surface of the water, and those elements adjacent the perimeter of the lake are anchored by guy lines 26 and posts 27.

*Example*

Elements of the type shown in FIGURE 2, comprising a sheet of polyethylene 5 mils thick bounded on the edges by a vertical bumper four inches in height are floated onto a three-acre pond and the peripheral elements are anchored to the shore line. About 1350 elements are used to cover the pond which is fed only by rainwater. During a two-week period in the summer when no rain falls and the average daily temperature is 90° F., approximately 5900 gallons of water evaporate when the protective covering is in place. The protective covering is then removed from the pond and during the succeeding two-week period during which the general weather conditions remain nearly unchanged, approximately 23,000 gallons of water evaporate.

Reasonable variation and modification are possible within the scope of the foregoing disclosure, drawing and the appended claims to the invention the essence of which is that there have been provided a protected body of liquid having a large extended surface area covered with a number sufficient to substantially entirely cover the same with flexible, impervious, but sufficiently rigid to tend to remain extended, floating elements, which can be flexibly connected, and which, in one embodiment, can be provided with bumper elements, as described, and which, in another embodiment, can be but need not be provided with such bumper elements but which can be spot welded or otherwise sealed together flexibly and further, if desired, supported by buoys and/or equipped with struts to provide stiffening, in which case the membrane or sheet need not of itself be sufficiently rigid to tend to extend to its full size; and a method which comprises floating a plurality of elements upon a body of liquid such as a water reservoir from the shore line thereof substantially as set forth and described herein.

I claim:

1. A method of protecting a liquid supply and for preventing surface evaporation from a large body of liquid subject to wave motion, turbulence due to wind, which comprises floating onto said large body of liquid a plurality of substantially vapor-impervious, flexible, but sufficiently rigid to tend to remain extended, sheet-like plastic film floating elements, each having an extended area, each being composed of film of the order of about 5 mils thickness, and each being peripherally surrounded by a bumper element which prevents stacking upon each other of said floating elements whenever turbulence, or wave motion or action of a floating current, causes adjacent elements to tend to slip over each other and, therefore, to leave an open exposed area of liquid, said film thickness being such that the film conforms to the surface of the liquid when it is deformed due to wave motion, turbulence due to wind, and the like.

2. A method according to claim 1 wherein the plastic floating element is a polyolefin which can be floated on said liquid.

3. A method according to claim 2 wherein said polyolefin is selected from the group of polyethylene and polypropylene.

4. A method according to claim 3 wherein the polyolefin is in sheeted-out form.

5. A method according to claim 4 wherein the polyolefin is supported at intervals with buoys and stiffened at intervals with stiffening members.

6. A method according to claim 1 wherein the floating elements are flexibly interconnected.

References Cited in the file of this patent

FOREIGN PATENTS 13,780/28    Australia _____ June 11, 1928

OTHER REFERENCES

Chemical Engineering, September 1957, page 180.